US008838094B2

(12) United States Patent
Thing (10) Patent No.: US 8,838,094 B2
(45) Date of Patent: Sep. 16, 2014

(54) ACQUIRING INFORMATION FROM VOLATILE MEMORY OF A MOBILE DEVICE

(75) Inventor: Ling Ling Vrizlynn Thing, Singapore (SG)

(73) Assignee: Agency for Science, Technology and Research, Singapore (SG)

(*) Notice: Subject to any disclaimer, the term of this patent is extended or adjusted under 35 U.S.C. 154(b) by 94 days.

(21) Appl. No.: 13/813,038

(22) PCT Filed: Jul. 29, 2011

(86) PCT No.: PCT/SG2011/000270
§ 371 (c)(1),
(2), (4) Date: Feb. 26, 2013

(87) PCT Pub. No.: WO2012/015363
PCT Pub. Date: Feb. 2, 2012

(65) Prior Publication Data
US 2013/0210423 A1    Aug. 15, 2013

Related U.S. Application Data

(60) Provisional application No. 61/369,135, filed on Jul. 30, 2010.

(51) Int. Cl.
*H04W 24/00* (2009.01)
*G06F 17/00* (2006.01)
(52) U.S. Cl.
CPC .............. *H04W 24/00* (2013.01); *G06F 17/00* (2013.01)
USPC ............................ 455/425; 711/118; 711/158

(58) Field of Classification Search
USPC ................................. 455/411; 710/8; 714/758
See application file for complete search history.

(56) References Cited

U.S. PATENT DOCUMENTS

| 8,533,369 | B2* | 9/2013 | Chen et al. | 710/8 |
| 8,666,366 | B2* | 3/2014 | DeAtley | 455/411 |
| 2005/0193173 | A1 | 9/2005 | Ring et al. | |
| 2007/0248029 | A1 | 10/2007 | Merkey et al. | |
| 2008/0244034 | A1 | 10/2008 | Shannon et al. | |
| 2009/0125782 | A1* | 5/2009 | Josefiak et al. | 714/758 |
| 2009/0136140 | A1 | 5/2009 | Kim et al. | |
| 2009/0164740 | A1 | 6/2009 | Choi et al. | |

FOREIGN PATENT DOCUMENTS

WO    2008156328 A2    12/2008

OTHER PUBLICATIONS

International Preliminary Report on Patentability for International Application No. PCT/SG2011/000270 dated Jul. 2, 2012.
Kiley et al., "Advances in Digital Forensics IV," IFIP International Federation for Information Processing, Edited by: Indrajit Ray and Sujeet Shenoi, (Boston: Springer), Aug. 2008, Chapter 11, pp. 129-138.

(Continued)

*Primary Examiner* — David Q Nguyen
(74) *Attorney, Agent, or Firm* — Winstead, P.C.

(57) ABSTRACT

According to various embodiments, there is provided a method of acquiring information from volatile memory of a mobile device, the method including: accessing the volatile memory of the mobile device used by an application operating on the mobile device to store communicated information with a communication device; acquiring a copy of data present in the volatile memory; and analyzing the copy of data to extract the communicated information.

19 Claims, 9 Drawing Sheets

(56) References Cited

OTHER PUBLICATIONS

Frank Adelstein, "Live Forensics: Diagnosing your System Without Killing it First," Communications of the ACM, vol. 49, No. 2, Feb. 2006, pp. 63-66.
Ahmed et al., "Mobile Forensics: an Overview, Tools, Future Trends and Challenges from Law Enforcement Perspective," 6th International Conference on E.Governance, ICEG, Emerging Technologies in E-Government, M-Government, Dec. 2008, pp. 312-323.
Marwan Al-Zarouni, "Introduction to Mobile Phone Flasher Devices and Considerations for their use in Mobile Phone Forensics," In Proceedings of the 5th Australian Digital Forensics Conference, Dec. 3, 2007, pp. 1-11.
Ashcroft et al., "Forensic Examination of Digital Evidence: A guide for Law Enforcement," National Institute of Justice (NIJ) Special Report, Apr. 2004, pp. 1-88, see pp. 7-18.
"Better writing," http://www.askoxford.com, 2010, pp. 1-2.
Ayers et al., "Cell Phone Forensic Tools: An Overview and Analysis Update," National Institute of Standards and Technology, Technical Report 7387, Mar. 2007, pp. 1-154, see pp. 8-41.
Berte et al., "Fast Smart Phones Forensic Analysis Results Through Mobile Internal Acquisition Tool and Forensic Farm," International Journal of Electronic Security and Digital Forensics, vol. 2, No. 1, Mar. 2009, pp. 18-28.
Bhadsavle et al., "Validating Tools for Cell Phone Forensics," Southern Polytechnic State University, Technical Report CISE-CSE-08-05, 2008, pp. 1-8.
Carrier et al., "A Hardware-Based Memory Acquisition Procedure for Digital Investigations," Digital Investigation, Issue 1(1), Feb. 2004, pp. 1-14.
Casadei et al., "Forensics and SIM Cards: an Overview," International Journal of Digital Evidence, vol. 5, Issue 1, Fall 2006, pp. 1-21.
Jason Chen, "An introduction to Android," Google 1/0, 2008, pp. 1-49.
Distefano, et al., "An Overall Assessment of Mobile Internal Acquisition Tool," In Proceedings of the 8th Digital Forensics Research Conference (DFRWS), Digital Investigation, vol. 5, Sep. 2008, pp. S121-S127.
Farmer et al., "The Coroner's Toolkit (TCT)," Aug. 1999, pp. 1-3.
Andrew Hoog, "Android Forensics," presented at Mobile Forensics World 2009, May 2009, pp. 1-29.
Hoog et al., "iPhone Forensics Whitepaper Introduction," https://viaforensics.com, Jun. 2009, pp. 1-9.
Husain et al., "iForensics: Forensic Analysis of Instant Messaging on Smart Phones," Digital Forensics and Cyber Crime, vol. 3, Jan. 2010, pp. 9-18.
Jansen et al., "Forensic Software Tools for Cell Phone Subscriber Identity Modules," Conference on Digital Forensics, Association of Digital Forensics, Security, and Law (ADFSL), Apr. 2006, pp. 1-13.
Jansen et al., "Overcoming Impediments to Cell Phone Forensics," In Proceedings of the 41st Hawaii International Conference on System Sciences, 2008, pp. 1-9.
Kim et al., "Data Acquisition from Cell Phone using Logical Approach," In Proceedings of World Academy of Science, Engineering and Technology, vol. 26, Dec. 2007, pp. 29-32.
Greg Kumparak, "Google: Android Now Shipping on 60,000 Handsets Per Day," http://www.mobilecrunch.com, Feb. 2010, pp. 1-4.
Mokhonoana et al., "Acquisition of a Symbian Smart Phone's Content with an On-Phone Forensic Tool," Department of Computer Science, University of Pretoria, 2007, pp. 1-6.
Petroni, Jr., et al., "FATKit: A Framework for the Extraction and Analysis of Digital Forensic Data from Volatile System Memory," Digital Investigation, vol. 3, No. 4, Dec. 2006, pp. 197-210.
Bradley Schatz, "BodySnatcher: Towards Reliable Volatile Memory Acquisition by Software," In Proceedings of the 7th Digital Forensics Research Conference (DFRWS), Digital Investigation, vol. 4, Sep. 2007, pp. S126-S134.
Sears et al., "Investigating Touchscreen Typing: The Effect of Keyboard Size on Typing Speed," Technical report, Oct. 1998, pp. 1-12.
Simon et al., "Enhancement of Forensic Computing Investigations Through Memory Forensic Techniques," International Conference on Availability, Reliability and Security, 2009, pp. 995-1000.
Svein Willassen, "Forensics and the GSM Mobile Telephone System," International Journal of Digital Evidence, vol. 2, No. 1, Spring 2003, pp. 1-17.
Svein Willassen, "Forensic Analysis of Mobile Phone Internal Memory," Advances in Digital Forensics, IFIP International Federation for Information Processing, Springer, vol. 194, Mar. 2006, pp. 191-204.
Williamson et al., "Forensic Analysis of the Contents of Nokia Mobile Phones," In Proceedings of the 4th Australian Digital Forensics Conference, Dec. 2006, pp. 1-12.

\* cited by examiner

ACQUIRING INFORMATION FROM VOLATILE MEMORY OF A MOBILE DEVICE

CROSS REFERENCES TO RELATED APPLICATIONS

The present application is a U.S. National Stage Application under 35 U.S.C. §371 of International Application No. PCT/SG2011/000270, filed on Jul. 29, 2011, which claims the benefit of U.S. Provisional Patent Application No. 61/369, 135, filed on Jul. 30, 2010; the complete disclosures of which are incorporated herein by reference.

TECHNICAL FIELD

Various embodiments relate to acquiring information from volatile memory of a mobile device.

BACKGROUND

Digital forensic procedure typically involves steps such as "pulling the plug", acquiring data from static media, analysing and correlating the data to retrieve relevant evidence in a forensically sound manner. This forensic investigation procedure prevents further interference on potential evidence, is reliable and hence, acceptable by the law enforcement agencies during crime investigation involving computer systems.

When evidence is stored (or being transferred) off-site or a communication session discussing criminal activities is ongoing, the "pull the plug" approach may not be appropriate. As static storage media increases in size, so does the amount of acquired data and potential evidence that requires processing. A live analysis of the current state of the system and its applications, is therefore necessary, so as to allow a more efficient forensic investigation process.

Techniques to protect the privacy of users and confidentiality of user data, such as encryption and password protection, have also indirectly provided counter forensics means to technologically aware criminals. Therefore, conventional forensic methods are no longer adequate and more research efforts have been placed in live memory forensic analysis of computer systems in recent years to complement or enhance these conventional forensic methods.

In mobile device forensics, live memory forensics has an even more important role to play. An example would be in mobile phones, which are becoming increasingly prevalent and are evolving into "smarter" devices (i.e. smartphones with higher processing power and enhanced features), where capabilities to perform in-depth forensics on such devices become essential.

However, current mobile phone forensics are still restricted to research and analysis of static data on subscriber identity module (SIM), memory cards and the internal flash memory. The constraint on storage capacity implies that exceedingly large amount of potential evidence need not be analysed. However, due to this limited storage, volatile information such as application data, Internet browsing data and instant messaging conversation histories are often not stored in non-volatile storage media. This is unlike computer systems which allow the caching and backup of a large amount of data (e.g. Microsoft Network (MSN) chat history).

For computer systems, an example is found in "Advances in Digital Forensics IV, IFIP International Federation for Information Processing, Springer, 285:129-138, August 2008" disclosing the use of a forensic tool, "AccessData Forensic Toolkit", to examine artifacts recoverable from non-volatile memory when web-based IM services are executed on a Windows XP system. While evidence of forensic value (such as screen name and estimated time of conversation) could be retrieved, very limited chat logs were recoverable. Parameters such as the message length and human response time during chatting, which could affect the experimental results, were not defined. Evidence acquisition without the knowledge of the messages contents was also not discussed.

Returning to mobile phones, as they function to support communications, there is a need to be able to perform forensic analysis on its interactive based applications.

While mobile phone forensic tools exist (such as "TULP 2G", "MOBILedit! Forensic", "Cell Seizure" and "Oxygen Phone Manager"), which may be used on "Nokia" mobile phones, they have been found unable to extract certain information from the mobile phones. For instance, MD5 hash information was not found using "MOBILedit!" while SHA1 hash information was not found using "Cell Seizure".

SUMMARY

According to various embodiments, there is provided a method of acquiring information from volatile memory of a mobile device, the method including: accessing the volatile memory of the mobile device used by an application operating on the mobile device to store communicated information with a communication device; acquiring a copy of data present in the volatile memory; and analysing the copy of data to extract the communicated information.

In the context of various embodiments, the term "information" may mean content that is stored in volatile memory at a particular point of time. Such content includes data of interest, i.e. the data that is to be analysed, and data of no interest. The term "volatile memory" may refer to memory that loses its content when power is turned off or lost, such as random access memory (RAM). In the context of various embodiments, the content of the volatile memory includes data that is to be acquired, analysed and reconstructed; such data including, but not limited to, text messages and non-text data. In the context of various embodiments, the term "mobile device" may mean a handheld subscriber terminal that can connect to a cellular network belonging to a mobile network operator. The mobile device may be a mobile phone, such as a smartphone, i.e. a phone having a mobile operating system (such as the "Apple iOS", "Android", "Microsoft Windows Mobile", "Symbian", "BlackBerry OS" and "Linux") providing advanced computing ability that can wirelessly access the Internet and operate web-based applications. In the context of various embodiments, the mobile device refers to a handheld mobile phone, e.g. designed more as a special-purpose appliance performing a set of predefined tasks allowed by the operating system used by the mobile device. The range of devices over which toolkits for mobile devices operate is typically narrowed to distinct platforms for a manufacturer's product line, an operating system family, or a type of hardware architecture. Thus, in the context of various embodiments, the mobile device (which may be a hand held mobile phone) is not a device designed for general-purpose systems, such as personal computers (PC) and laptops.

In the context of various embodiments, the term "accessing" may mean reading the data found in an address of the volatile memory. In the context of various embodiments, the term "application" may mean a software or a program installed in the mobile device. The software or program, when executed, may provide instructions to the mobile device to perform sequences or operations. Examples of applications that may be used according to embodiments include instant messaging software that allow point-to-point communication with another instant messaging software (without use of an Internet browser) and an Internet browser that can access a website that hosts the instant messaging service. Generally, application may be a text exchange application. In the context of various embodiments, the term "communicating information" or "communicated information" may mean data that is transmitted by the application on the mobile device to the communication device and data received by the application on the mobile device to the communication device. Such data may include content exchanged between the mobile device and the communication device and therefore includes, but is not limited, to text messages. In the context of various embodiments, the term "communication device" may mean a separate electronic device to the mobile device. The separate electronic device includes a computer or another mobile device running an application that is compatible and able to communicate with the application operating on the mobile device.

In the context of various embodiments, the phrase "acquiring" may mean obtaining an image or performing a low-level copy of the content present in the volatile memory at a particular address. In a low-level copy, all content (including text messages and non-text data) may be captured. In the context of various embodiments, the phrase "image" may mean an exact copy of the volatile memory being accessed.

In the context of various embodiments, the term "analysing" may mean studying the copied content to identify specific data. In the context of various embodiments, the term "extract" may mean retaining only the desired data of the copied content and disposing the rest of the copied content.

According to various embodiments, there is provided a mobile device including volatile memory configured to be used by an application operating on the mobile device to store communicated information with a communication device; an acquirer configured to acquire a copy of data present in the volatile memory; and an analyser to analyse the copy of data to extract the communicated information.

In the context of various embodiments, the terms "detector", "acquirer" and "analyser" may be understood as any kind of a logic implementing entity, which may be special purpose circuitry or a processor executing software stored in a memory, firmware, or any combination thereof. Thus, in an embodiment, a circuit may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A circuit may also be a processor executing software, e.g. any kind of computer program, e.g. a computer program using a virtual machine code such as e.g. Java. The detector, acquirer and analyser may be implemented as separate components or may be implemented by an integrated processor.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DETAILED DESCRIPTION

Various embodiments provide tools for mobile device forensics, i.e. providing means to recover digital evidence from a mobile device, such as a mobile phone. Such digital evidence may be found as data in the subscriber identity module (SIM) card used by the mobile phone, external memory cards (such as cards in secure digital (SD) format) and the mobile phone internal memory (which includes volatile memory, such as random access memory (RAM); and non-volatile memory, such as flash memory).

Forensic tools acquire data from a device in one of two ways: physical acquisition or logical acquisition. Physical acquisition implies a bit-by-bit copy of an entire physical store (e.g. a memory chip), while logical acquisition implies a bit-by-bit copy of logical storage objects (i.e. active directories and files) that reside on a logical store (e.g. a file system partition). The difference lies in the distinction between memory as seen by a process through the operating system facilities (i.e. a logical view), versus memory as seen in raw form by the processor and other related hardware components (i.e. a physical view).

Physical acquisition may be performed in the following ways.

A physical image of a mobile phone internal flash memory may be obtained by desoldering the memory chip and reading it from a device programmer. Another way is to read the memory through the boundary-scan (JTAG) test pins. The extracted memory may then be examined to detect the presence of deleted file contents.

A tool, developed for both Linux and Windows platforms, and relying on a personal computer/smart card (PCSC) library may be used in the acquisition of the entire file system, including non standard files, on the SIM card. However, files with restricted read access conditions may not be extractable from such a tool.

For acquiring data from the internal flash memory of a Code Division Multiple Access (CDMA) mobile phone, a tool communicating with the phone through the RS-232C serial interface using the underlying "Qualcomm" Mobile Station Modem diagnostic mode protocol may be used.

A mobile phone flashing tool that can access the mobile phone flash memory and does not require installation on the mobile phone may be used. However, since such tools are designed to write to the memory, the effect of evidence being altered while performing a read is unknown. Further, the reading capability and memory access range of such flashing tools vary for mobile phones of different brands and models.

An on-phone forensic tool may be used to acquire active files from a mobile phone (for example, the "Sony Ericcson P800", which uses a "Symbian" OS (operating system) v7) and store it on removable media. Instead of interfacing with PC connectivity services, such a tool may interact with the operating system to perform a logical copy of the files. A limitation of the tool is that files in use (e.g. call logs, contacts) cannot be copied.

An internal acquisition technique may be used for mobile phones using "Symbian" OS v8. Mobile phone data may be acquired using a tool residing on removable media, instead of through a PC/mobile phone Universal Serial Bus (USB) connection. The tool may utilize the "Symbian" S60 File Server API (Application Programming Interface) in a read-only mode. A longer time may be taken to perform the acquisition, compared with "Paraben Device Seizure" (USB connection to phone) and P3nfs (Remote access through Bluetooth). The tool acquires more data compared to P3nfs but less data compared to "Paraben Device Seizure". The larger data size from "Paraben Device Seizure" may be due to additional information from its acquired data management.

A phone manager protocol filtering technique may be used to intercept data between the phone and the phone manager.

SIM forensic tools such as "Cell Seizure", "GSM.XRY", "MOBILedit! Forensic", "TULP 2G", "Forensic Card Reader", "Forensic SIM", "SIMCon" and "SIMIS" may be used to find information on IMSI (International Mobile Subscriber Identity) and SMS (Short Message Service)/EMS (Enhanced Messaging Service). "Paraben Device Seizure" used on a test data populated T-Mobile locked SIM shows that 100% of the test data may be retrieved.

Tools such as "Paraben Device Seizure", "Pilot-Link", "GSM.XRY," "Oxygen Phone Manager", "MOBILedit!", "BitPIM", "TULP 2G", "SecureView", "PhoneBase2", "CellDEK", "SIMIS2", "ForensicSIM", "Forensic Card Reader," "SIMCon" and "USIMdetective" may be used on mobile phone models such as "Samsung SGH-i300", "Motorola MPX220", "Sony Ericsson P910a", "Nokia 7610" and "BlackBerry 7780".

The "Android Debug Bridge" (ADB) may be used to acquire data from a mobile phone using an "Android" OS over A USB connection. Active files on the mobile phone may be retrieved through the "adb pull" command. Other tools such as "Nandroid backup" and "Paraben Device Seizure" may also be used to extract files residing in the mobile phone.

For acquiring information (e.g. call logs, SMS, contacts, emails, image files) from a 3G "iPhone" mobile phone running firmware 2.2 and not jailbroken, tools such as "WOLF", "Cellebrite UFED", "Paraben Device Seizure", "MacLock-Pick", "MDBackupExtract" and "Physical DD" may be used. The "Physical DD" tool may allow a bit-by-bit copy of the "iPhone" storage.

Logical acquisition may be performed in the following ways.

For an "Apple iPhone", data may be acquired logically through the tool "iTunes Backup". For instant messaging (IM) applications such as client-based versions of "AIM" and "Yahoo! Messenger"; and a web-based version of "GTalk", evidence such as screen names, timestamps and unique phrases (such as chat messages) was found in the retrieved files for the "AIM" and "Yahoo! Messenger However, such evidence may not be found for "GTalk". Data from temporary Internet files and cache of the "Safari" browser (on which "GTalk" was accessed) only provides information on the time that "GTalk" was accessed.

Accordingly, various embodiments provide tools that facilitate mobile phone forensics from volatile memory of a mobile phone.

Figure 1:
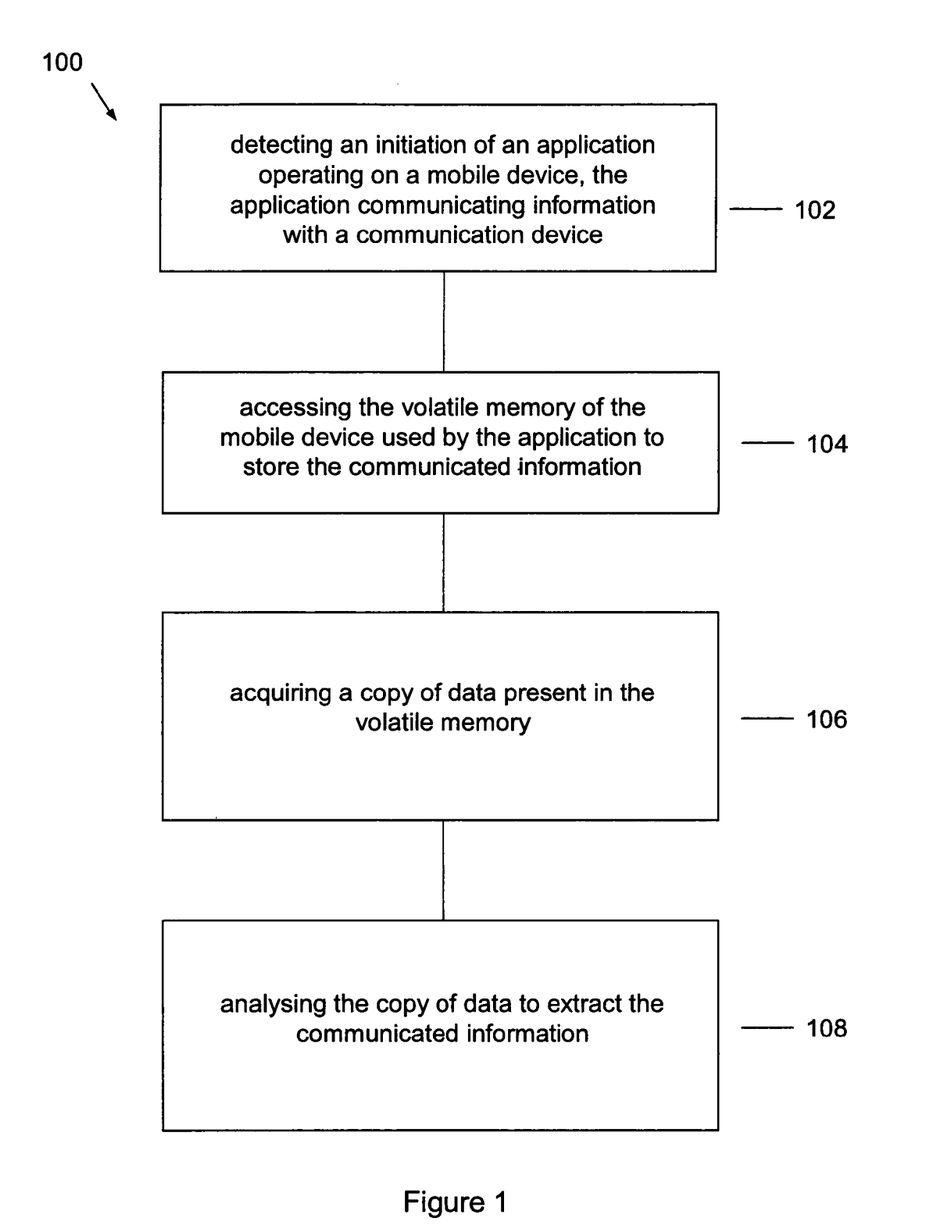
FIG. 1 shows a flow chart illustrating a method of acquiring information from volatile memory of a mobile device.

FIG. 1 shows a flow chart 100 illustrating a method of acquiring information from volatile memory of a mobile device. The method may be used, for example, to acquire information from a mobile phone.

In 104, the volatile memory of the mobile device used by the application operating on the mobile device to store communicated information with a communication device is accessed.

In 106, a copy of data present in the volatile memory is acquired.

In 108, the copy of data is analysed to extract the communicated information.

In 102, which is optional, an initiation of the application operating on the mobile device may be detected. While the embodiment in FIG. 1 shows 102 occurring before 104, another embodiment (not shown) may detect initiation of the application operating on the mobile device after accessing the volatile memory of the mobile device.

In the context of various embodiments, the term "initiation" may mean the startup of an application.

With reference to 102 or 104, the application may use a text message exchange service hosted on the communication device, so that the communicated information includes a text message. In addition, the communication device may be a server.

With reference to 106, the copy of data may be acquired at a specified time interval from the initiation of the application of 102. By specifying a time interval, acquisition of data becomes automatic, whereby knowledge of the contents of the data acquired is not required. The specified time interval may be determined by the frequency the application operating on the mobile device is communicating information with the communication device. Operation of the application of 102 or 104 may be suspended when acquiring the copy of data.

With reference to 108, analysing the copy of data to extract the communicated information may further include locating an identifier and extracting the content associated with the identifier so as to obtain the communicated information. When the communicated information to be extracted is found in different portions of the copy of data, the identifier may be terms or structure that are common between these different portions of data.

Figure 2:
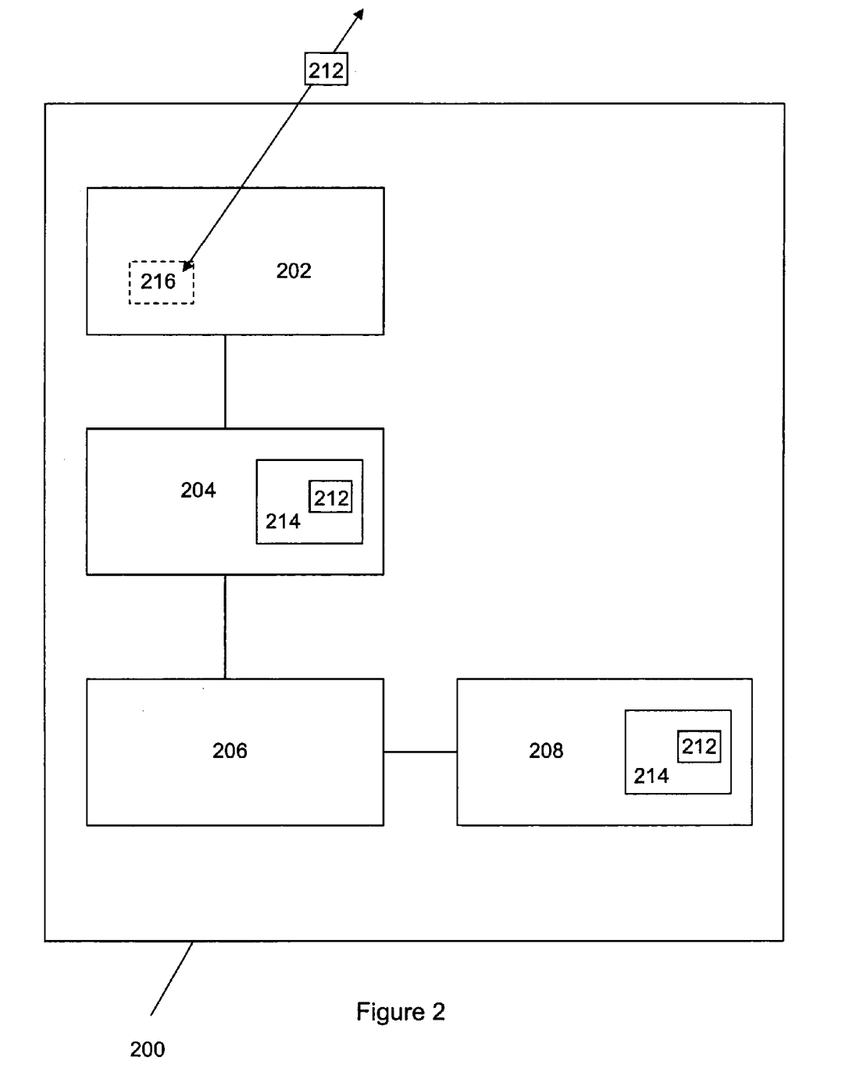
FIG. 2 is a schematic representation of a mobile device according to an embodiment.

According to various embodiments, the mobile device may be a mobile phone. FIG. 2 is a schematic representation of a mobile device 200 according to an embodiment. The mobile device may be, for example, a mobile phone.

The mobile device 200 includes volatile memory 204 configured to be used by an application 216 operating on the mobile device 200 to store communicated information 212 with a communication device (not shown); an acquirer 206 configured to acquire a copy of data 214 present in the volatile memory 204; and an analyser 208 configured to analyse the copy of data 214 to extract the communicated information 212. While the analyser 208 shown in FIG. 2 is implemented in the mobile device 200, in another embodiment (not shown), the analyser may be implemented external to the mobile device, such as in an external server like a PC, The analyser may be externally implemented when analysis of data in the volatile memory of the mobile device requires a processing capability beyond that provided by the mobile device.

The mobile device 200 may include an optional detector 202 configured to detect an initiation of the application 216 communicating information 212 with the communication device.

Figure 3:
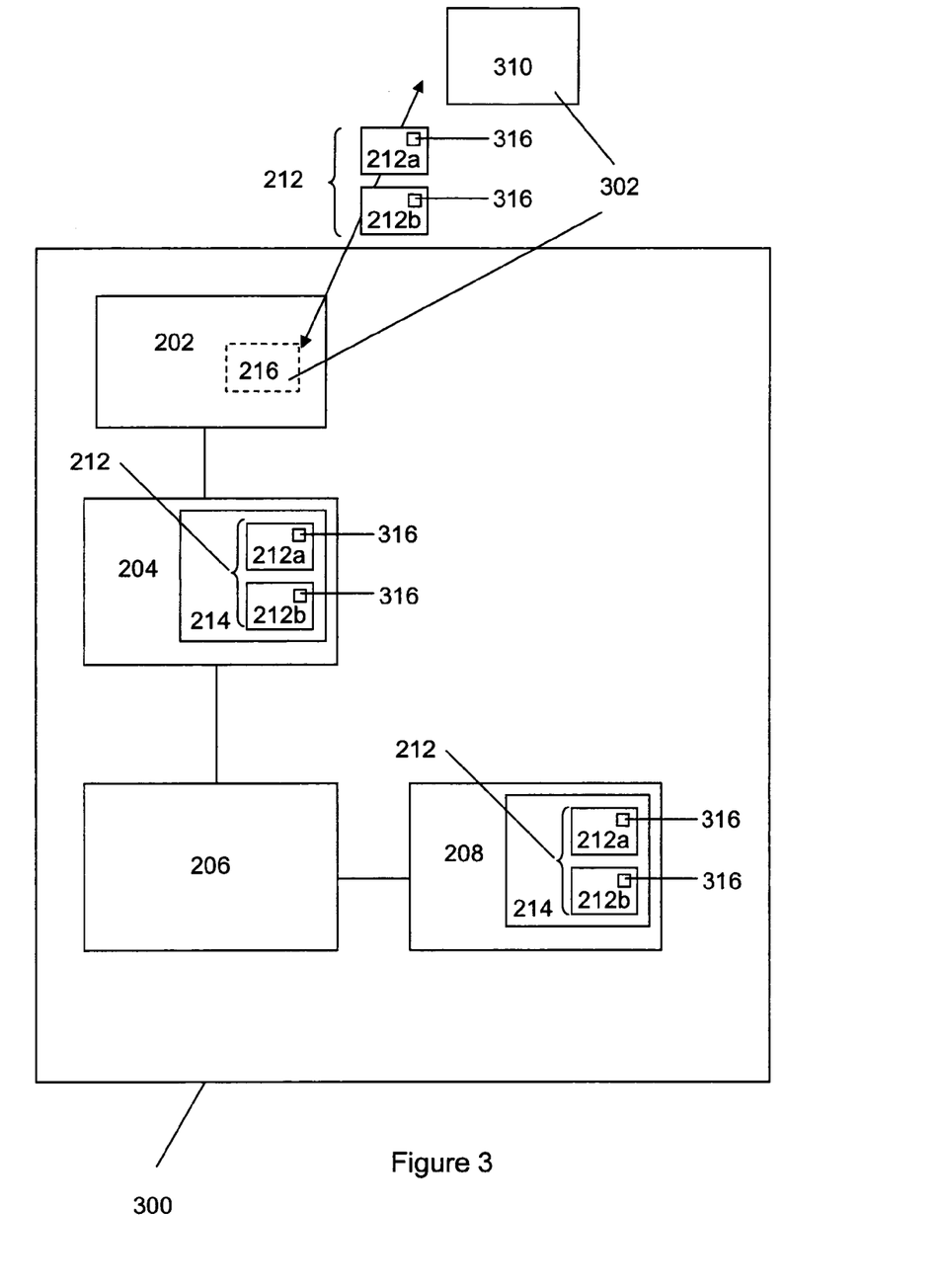
FIG. 3 is a schematic representation of a communication system according to an embodiment.

FIG. 3 is a schematic representation of a communication system 300 using a mobile device 300 according to an embodiment. The features of the mobile device 300 that are common with the mobile device 200 of FIG. 2 (such as the detector 202, the volatile memory 204, the acquirer 206 and the analyser 208) are already described above with reference to FIG. 2 are not further elaborated upon.

The application 216 communicates information 212 with a communication device 310.

The application 216 may use a text message exchange service 302 hosted on the communication device 310, so that the communicated information 212 includes a text message. Several text messages may be sent between the mobile device 200 and the communication device, these text messages being transmitted as packets of data 212a and 212b. In various embodiments, the communication device 310 may be a server. The acquirer 206 may be configured to acquire the copy of data 214 at a specified time interval from the initiation of the application 216. In various embodiments, the specified time interval may be determined by the frequency the application 216 communicates information with the communication device 310.

The acquirer 206 may be configured to suspend operation of the application 216 when acquiring the copy of data 214. The analyser 208 may be configured to locate an identifier 316 and configured to extract the content associated with the identifier 316 so as to obtain the communicated information 212. When the communicated information 212 to be extracted is found in different portions of the copy of data 214 (illustrated in FIG. 3 as the packets of data 212a and 212b being located at different segments of the copy of data 214), the identifier 316 may be terms or structure that are common between these different portions of data. The analyser 208 may be configured to execute a script to analyse the copy of data 214 to extract the communicated information 212.

Figure 4:
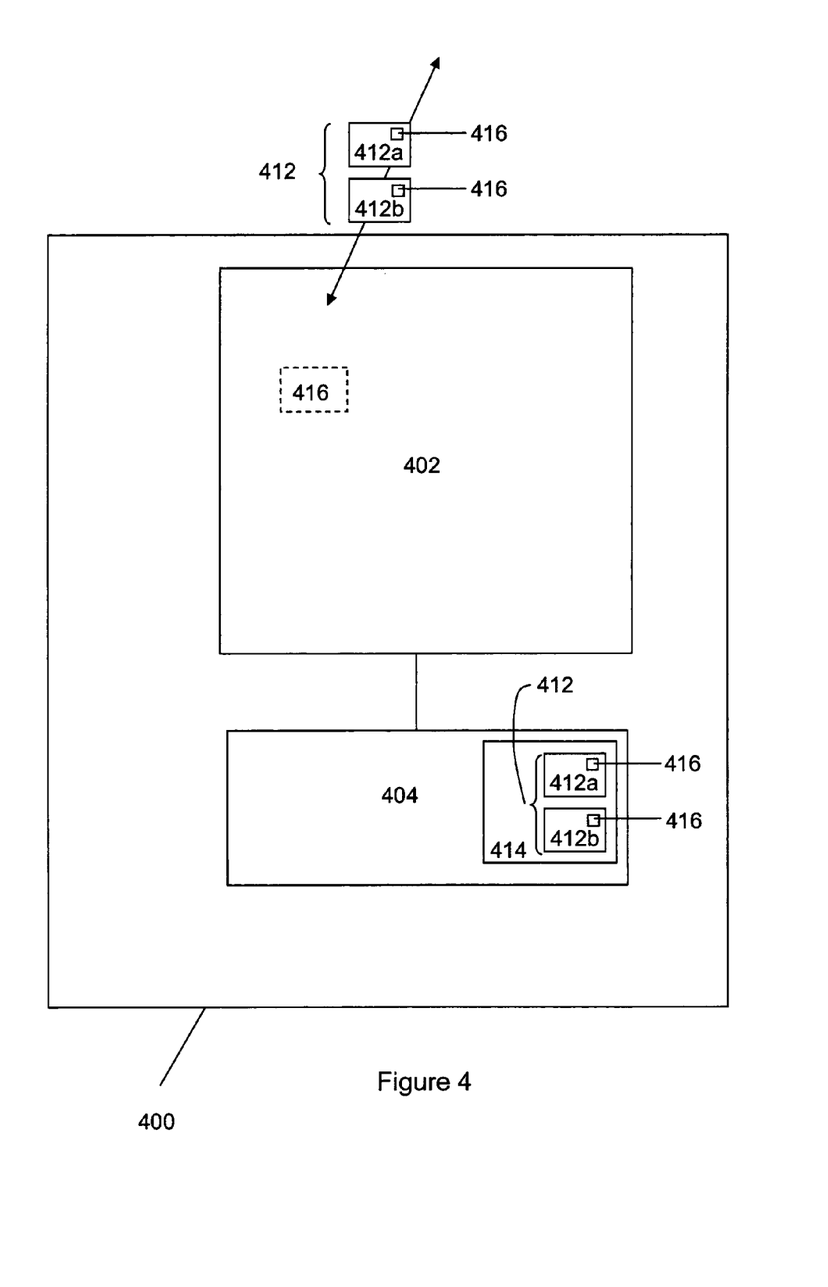
FIG. 4 is a schematic representation of a mobile device according to an embodiment.

FIG. 4 is a schematic representation of a mobile device 400 according to an embodiment.

Contrasting the mobile device 400 with the mobile device 200 of FIG. 2, a processor 402 implements the components of the detector 202, the acquirer 204 and the analyser 208.

In the mobile device 400, the processor 402 is configured to detect an initiation of an application 416 communicating information 412 with a communication device (not shown). Volatile memory 404 is configured to store the communicated information 412. The processor 402 is configured to acquire a copy of data 414 present in the volatile memory 404. The processor 402 is configured to analyse the copy of data 414 to extract the communicated information 412.

The application 416 may use a text message exchange service hosted on the communication device, so that the communicated information 412 includes a text message. In various embodiments, the communication device may be a server.

The processor 402 may be configured to acquire the copy of data 414 at a specified time interval from the initiation of the application 416. In various embodiments, the specified time interval may be determined by the frequency the application 416 communicates information with the communication device.

The processor 402 may be configured to suspend operation of the application 416 when acquiring the copy of data 414. The processor 402 may be configured to locate data with an identifier 416 and configured to extract the content associated with the identifier so as to obtain the communicated information 412. When the communicated information 412 to be extracted is found in different portions of the copy of data 414 (illustrated in FIG. 4 as packets of data 412a and 412b being located at different segments of the copy of data 414), the identifier 416 may be terms or structure that are common between these different portions of data. The processor 402 may be configured to execute a script to analyse the copy of data 414 to extract the communicated information 412.

Various embodiments provide a mobile device with a tool that may be used for forensic analysis of instant messaging occurring within a communication system, an example of which will be described with reference to FIG. 5.

Figure 5:
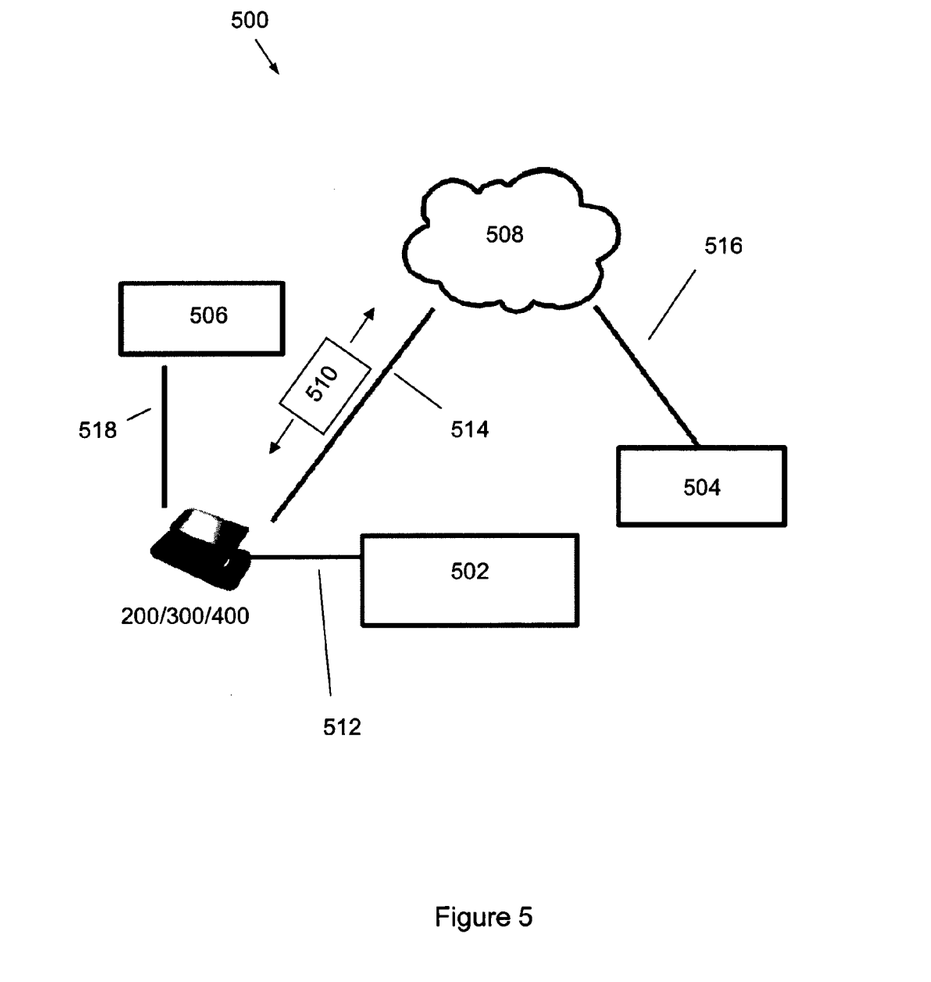
FIG. 5 is a schematic representation of a system using a mobile device according to various embodiments.

FIG. 5 is a schematic representation of a system 500 using a mobile device according to various embodiments, such as the mobile device 200/300/400 described with reference to FIG. 2, 3 or 4 respectively. The mobile device 200/300/400 may, for example, be a hand held mobile phone which may use an "Android" operating system where a web-based instant messaging application, such as "Google Talk (GTalk)" is operating.

The system 500 further includes a remote access device 502, a first communication device 504 and a second communication device 506.

The remote access device 502 may communicate with the mobile device 200/300/400 through a first communication link 512, such as a USB connection. The mobile device 200/300/400 exchanges communicated information with the first communication device 504, over a network 508, via a network packet 510. The network 508 is connected to the mobile device 200/300/400 through a second communication link 514, such as Wi-Fi. The network 508 is connected to the first communication device 504 through a third communication link 516, such as Ethernet. The second communication device 506 is connected to the mobile device 200/300/400 through a fourth communication link 518, such as Wi-Fi. The network 508 may be the Internet and the second communication device 506 may be a server computer.

The remote access device 502 may be used to control operation of the mobile device 200/300/400. The remote access device 502 may be a computer having an application that is able to communicate with and may be able control the operation of the mobile device 200/300/400. The remote access device 502 may, for example, run the application, monkey, which is part of the "Android" software stack and used to perform pseudorandom actions to programs on devices using an "Android" OS. Monkey may be used to perform deterministic actions with the remote access device 502 and may, for example, have the remote access device 502 become a message script generator (MSG), through an "Android Debug Bridge (ADB)". The MSG randomly generates a test message and a Monkey script during each run, to be executed by the Monkey. In this manner, the web-based instant messaging application of the mobile device 200/300/400 may be remotely controlled by the remote access device 502 to communicate information, which may for example be random messages automatically sent to the first communication device 504.

At the first communication device 504, an application may be running that uses a suitable library and protocol that is able to receive and process the communicated information, within the network packet 510, exchanged with the mobile device 200/300/400. For example, when the mobile device 200/300/400 is communicating information using the web-based instant messaging application, "GTalk", the application in the first communication device 504 may, for example, use "Smack" API, a Java library for IM clients to communicate using the Extensible Messaging and Presence Protocol (XMPP) used by "GTalk". The first communication device 504 may be a PC.

The second communication device 506 may be configured to analyse data from the mobile device 200/300/400, such as data present in the volatile memory of the mobile device 200/300/400, which contains content from the network packet 510. The analysis performed by the second communication device 506 may include communicated information between the mobile device 200/300/400 and the first communication device 504.

The contents of the network packet 510 may be analysed at either the second communication device 506 or the mobile device 200/300/400 itself. At either the mobile device 200/300/400 or the second communication device 506, data present in the volatile memory of the mobile device 200/300/400 may be acquired for analysis on the basis of parameters related to the generation of the communicated information in the network packet 510. Such parameters include: the message length; the character set used in the text message; the interval between messages and the interval between keypresses. For instance, consider an automated chat conversation between the mobile device 200/300/400 and the first communication device 504, effected by the remote access device 502 being configured to act as a MSG and a chat bot emulating a user at the first communication device 504. Configurable parameters on the MSG and the chat bot include the message length; the character set to support random message generation; the interval between messages (to emulate typing and reading response time) and the interval between keypresses. The contents of each message are composed by randomly selecting characters from the specified character set. The chat bot may be a Java console-based application that uses "Smack" API.

Process memory management of an OS in the mobile device 200/300/400 may use the kernel of the mobile device 200/300/400. For instance, the "Android" OS is handled by the Linux 2.6 kernel. "Android" uses an anonymous shared memory subsystem (ashmem) driver for handling shared memory among processes, instead of the standard Linux kernel's IPC shared memory module. The former allows the shared memory blocks to be reclaimed by the kernel, whereas the latter forbids it. Android also replaces the Out-of-Memory (00M) Killer module with its own Low Memory Killer driver to sacrifice the running processes on a mobile device when the memory is low.

In the mobile device 200/300/400, information on memory used by each operating application may be obtained from the file system provided by the kernel of the mobile device 200/300/400. Various embodiments query the file system of the mobile device 200/300/400 to obtain information on the volatile memory used by the application where communicated information is to be retrieved. For instance, in the "Android" OS, each running process' memory information can be obtained from the "procfs" virtual file system provided by the kernel. When an "Android" application is started, a directory is created under /proc. These directories are named by their process IDs (/proc/pid). The process memory can be accessed from the /proc/pid/mem file, while the entries in the /proc/pid/maps file provide the addresses of the process memory regions. The memory regions compose of the stack, heap and shared memory and also contain mappings to the system libraries, Dalvik executables and device drivers.

In the embodiment of FIG. 5, the memory acquisition tool, e.g. denoted as memgrab, performs a dump (or "grabbing") of a process memory. The tool, customised for the Android platform, locates and acquires the process memory by relying on the /proc/pid/maps and /proc/pid/mem files in the "procfs".

The memgrab tool may support specific memory region extraction, therefore providing a means to access the volatile memory of the mobile device 200/300/400 used by the web-based instant messaging application to store text messages exchanged between the mobile device 200/300/400 and the device the mobile device 200/300/400 is communicating with (being in FIG. 5, the first communication device 504) and acquire a copy of data present in the accessed volatile memory. The memgrab tool may also support specification of the acquisition interval, therefore providing a means to specify a time interval at which data present in the accessed volatile memory is copied.

In addition, the memgrab tool may provide a command, executable on the system or library used by the mobile device 200/300/400, that suspends or resumes operations of processes running on the mobile device 200/300/400. The memgrab tool may also be able to gain access to the memory address used by the processes running on the mobile device 200/300/400. For instance, the memgrab tool may perform a Process Trace (ptrace) system call, which allows the tracing of a process by controlling its execution, as well as gaining access to its address space. To commence tracing of the target process, a command, such as "PTRACE_ATTACH", may be specified in the system call. The target process may then be suspended while the memgrab tool acquires a snapshot of the process memory. A command, such as "PTRACE_DETACH", may then be issued to resume the target process execution. In this manner, a means is provided to suspend the operation of the web-based instant messaging application in the mobile device 200/300/400.

The data to be captured from the memory dump effected by the memgrab tool may be outgoing messages and incoming messages. To identify the content which is to be extracted from the data captured from the memory dump, the memgrab tool may be configured to recognise elements of the protocol format used by the outgoing messages and incoming messages that are to be extracted. These elements of the protocol format may, for example, be embedded in the header portion of data packets in the data captured from the memory dump. For example, in "GTalk" format, an outgoing message may have the following form before processing to be sent as the network packet 510 to the first communication device 504:

```
[["m","userone@gmail.com/Smack
-> F0FBEF9E","MESSAGE","MSG_ID","c"]]
``` while the outgoing message may have the following form after processing to be sent as the network packet 510 to the PC 504:

```
[[1011, ["c",['4890438E28A0973D',["m","
-> userone@gmail.com/SmackF0FBEF9E"
-> ,"MESSAGE","","s",["MESSAGE"]
```

An incoming message from the first communication device 504 may have the following form:

```
[[1013,["c",['4890438E28A0973D',["m","
-> usertwo@gmail.com/SmackEC940444"
-> ,"MESSAGE","","r",["MESSAGE"]
```

The common structure or terms in the incoming and outgoing messages are:

```
["m","USER_ID@gmail.com/XMPP_RESOURCE",
-> "MESSAGE","
``` so that the following regular expression may be used to capture the message contents:

```
["m","[.a-zA-Z\d]+@gmail.com
-> [/a-zA-Z0-9]*","(.*);
```

Thus, when data present in the volatile memory of the mobile device 200/300/400 is acquired, a means is provided to analyse the data to locate an identifier and extract the content of the data, the content being the text message. While the example above uses common structure or terms in the analysed data as the identifier, it will be appreciated that keywords may instead be used as the identifier.

Based on a list of generated messages, a memory dump analyser (MDA) of the mobile device 200/300/400 may use one or more scripts, for example, "Perl" scripts to perform searches on each dump. The results of the findings of whole or partial messages may then be compiled into a report.

The following procedure may be performed in the mobile device 200/300/400 when a chat session between the mobile device 200/300/400 and the first communication device 504 is taking place.

To prevent dumping irrelevant memory regions, the region where messages reside may be identified.

For each entry in the file directory system that manages virtual memory information in the mobile device 200/300/400, memory dumps may be performed to search for the occurrence of messages in the dumps. For instance, a directory such as "proc/pid/maps" may be searched. In various embodiments, messages may be found in different memory banks of the mobile device 200/300/400, where messages may be found in a shared memory region.

In various embodiments, the heap and stack memory contains information such as database initialisation and chat session credentials. However, such information has a higher persistence and thus may be found in cache data of the mobile device 200/300/400.

In various embodiments, analysis of the cached data focuses on analysis of volatile evidence in the form of an exchange of chat messages transmitted as content in the network packet 510 exchanged between the mobile device 200/300/400 and the first communication device 504.

In various embodiments, cached data may be stored in different databases that are accessible from a directory in the file directory system of the mobile device 200/300/400. For instance, the "/data/data/com.android.browser/databases/" directory has 3 SQLite databases, namely "browser.db", "webviewCache.db" and "webview.db".

In various embodiments, a first database, for example, "browser.db", may have bookmarks and searches tables. The bookmarks table may store a history of accessed uniform resource locators (URLs). The searches table may contain all past keywords have entered into search boxes.

In various embodiments, a second database, for example "webviewCache.db", may have a cache table. The cache table may hold cached images (in the following exemplary formats: gif, jpeg, ico and png); javascripts (js); and cascading style sheets (css).

In various embodiments, a third database, for example, "webview.db", may have formdata, httpauth, cookies, formurl and password tables. The formdata table may store saved values keyed into a form. The httpauth table may hold past hyper text transmission protocol (HTTP) authentication information and may be empty. The cookies table may store saved cookies. The formurl table may stored the URL of past user accessed forms. The password table may store saved passwords, which may contained entries of accessing a WIFI router.

Thus, from the above description of the three databases (exemplified by "browser.db", "webviewCache.db" and "webview.db") for cached data, in various embodiments, exchanged chat messages may not be retrievable from cached data.

In various embodiments, the faster text messages are typed and sent in the mobile device 200/300/400, the sooner the volatile memory in the mobile device 200/300/400 will be overwritten by new messages, so that the overwritten messages may no longer be retrievable. Thus, determining when a memory dump is executed may depend on the frequency the mobile device 200/300/400 communicates with the first communication device 504 during the chat session between the mobile device 200/300/400 and the first communication device 504. This has an impact on the time interval a copy of data present in the volatile memory of the mobile device 200/300/400 is acquired from the initiation of the instant messaging application operating on the mobile device 200/300/400.

Figure 6A:
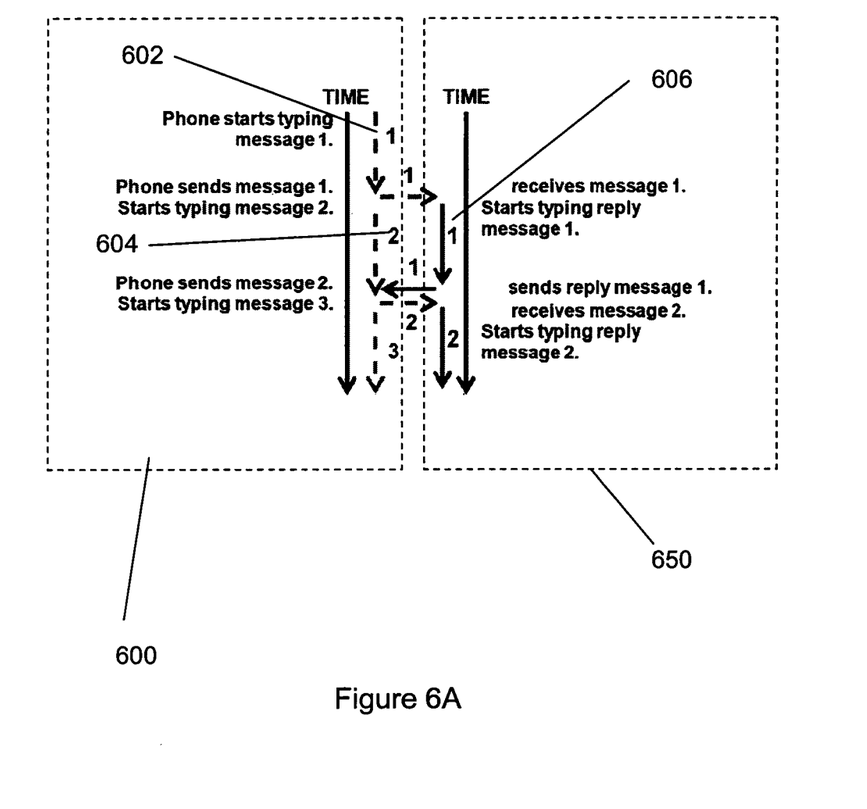
FIGS. 6A and 6B show operating scenarios of two mobile devices according to various embodiments.
Figure 6B:
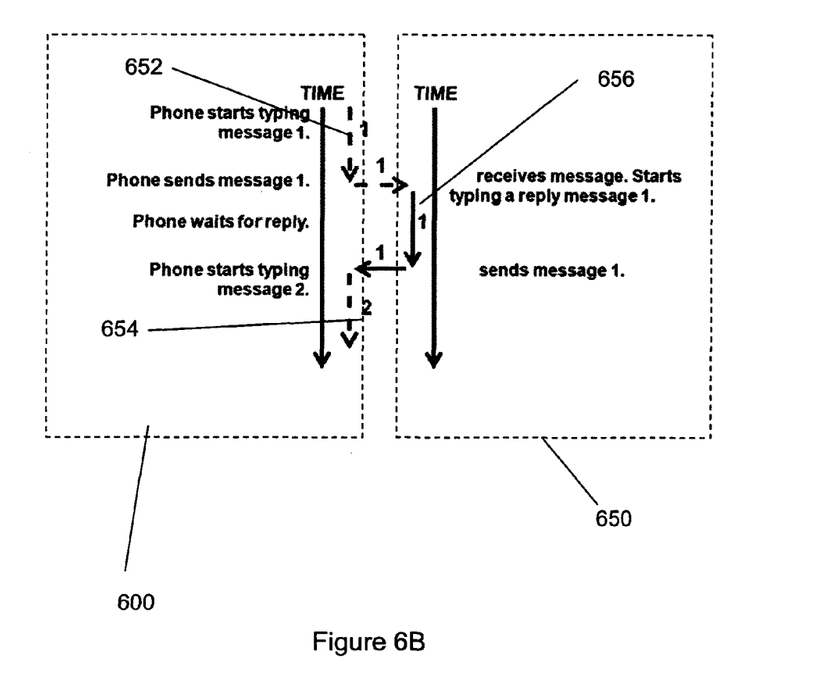

Two example scenarios are considered, shown in FIGS. 6A and 6B. FIGS. 6A and 6B show two mobile devices 600 and 650 exchanging communicated information (602, 604, 606 for FIG. 6A and 652, 654 and 656 for FIG. 6B). Either of the volatile memories of the mobile devices 600 and 650 may be analysed to extract the communicated information. The mobile device 600 may be a mobile phone (such as the mobile device 200/300/400 of FIG. 5), while the mobile device 650 may be another mobile phone (such as another mobile device 200/300/400 of FIG. 5).

FIG. 6A shows a "no-wait" scenario, where there is continuous sending and receiving of messages between the mobile device 600 and the mobile device 650. FIG. 6B shows a "waiting" scenario where the mobile device 600 and the mobile device 650 takes turns to send and wait for a response from the other.

In both FIGS. 6A and 6B, the interval between the sending of the messages depends on the interval between keypress, k and message length, l, where negligible reading time and network delay are both assumed. The message sending interval in each direction is therefore (k(l−1)) for the "no-wait" scenario of FIG. 6A and (2k(l−1)) for the "waiting" scenario of FIG. 6B. Further, in both scenarios, the mobile device 600 initiates the message typing and sending to the PC 504.

In the scenario of FIG. 6A (where no waiting time is considered), once the first message 602 is typed and sent by the mobile device 600, the mobile device 600 starts typing and sending the next message 604 at the same time that a first message 606 is typed and sent by the mobile device 650. This is a worst case scenario as there is continuous sending and receiving of messages, emulating the situation where a user does not wait for a reply before typing (and sending) a new message.

In the scenario of FIG. 6B (where waiting time is included), once the first message 652 is typed and sent by the mobile device 600, a first message 656 starts to be typed on the mobile device 650, while the mobile device 600 waits. After the first message 656 is typed and sent by the mobile device 650, the next message 654 is typed and sent by the mobile device 600. This scenario emulates the situation where both users take turns to send and wait for a response from the other.

For the scenario of FIG. 6A, an embodiment of a mobile device may use a shorter time interval, from the initiation of the web-based instant messaging application, to acquire a copy of data present in the volatile memory of the mobile device 600, compared to the longer time interval used for the scenario of FIG. 6B.

Various embodiments provide an automated system that can perform live memory forensic analysis for mobile devices. Various embodiments have security analysis applications due to the capability to acquire data from volatile memory and to perform analysis. Thus, analysis of live memory dynamic properties of interactive based applications is facilitated.

Various embodiments may provide the following features: real-time identification of evidentiary data; live modeling of evidence dynamics; volatility analysis of mobile device applications; and parameter optimization for forensic tools.

Various embodiments may have the following applications in: law enforcement agencies—to retrieve high volatility evidence, enhance mobile device forensic tools and facilitate digital forensic investigation; commercial/financial sectors—to trace leakage of confidential corporate information; and for end users—to monitor communications for child protection.

Various embodiments may also provide the following benefits: identify and retrieve crucial evidence; detect and trace leakage of confidential corporate information; and protect children against cyber bullies and child grooming criminals.

Implementation of an embodiment to perform investigation on the persistency of a mobile device volatile data and real-time evidence acquisition analysis is discussed below.

Experiments and Results

An investigation of the persistency of relevant evidence pertaining to a web-based "Google Talk (GTalk)" instant messaging application was conducted to examine the presence of evidence relating to the instant messaging application.

Parameters such as the message sending interval and the message length were determined as follows.

For a mobile phone using a QWERTY keyboard measuring 6.8 cm from the Q to P keys, it was found that the number of English words per minute (wpm) that may be typed may range from 9.9 ($\sigma$=2.4) to 21.1 ($\sigma$=1.5), assuming there are 5 characters per word. Taking the upper limit of this range and further factoring a normal distribution, 24.1 wpm may be typed on the mobile phone 200/300/400, so that an average delay between two keypresses may be 500 ms. Thus, the defined message interval was 500 ms.

Only the printable characters specified on the phone's QWERTY keyboard were used. The character set was composed of only characters that required one keypress. For example, a capital letter "A" requires two keypresses: ALT+A. This was to prevent an experimental scenario where the message length in memory is inconsistent with the total number of keys pressed. Three different message lengths were considered as estimated indicators to perform the investigations. In each message, one keypress was for the final ENTER key. The three message lengths (in characters) were:

- 75—on the assumption that a user types at least one sentence (which is meaningful and of forensic value) having 15 words with an average of 5 characters per word
- 150—being an average of the upper limits of a SMS (160 characters) and a Twitter message (140 characters).
- 225—being the assumption that a user composes a message having 3 sentences, each with the above average length of 75.

After defining the above parameters, investigations with different memory dump intervals were carried out. In each experiment, a chat session was started between a mobile phone according to various embodiments and a PC. The mobile phone sent 15 outgoing messages and received 15 incoming messages from the PC in return.

A first experiment studied the persistency of chat messages in the volatile memory of the mobile phone. The message length was set to 75 characters and the interval between the keypresses to 500 ms. In the first experiment, the "wait" scenario described with reference to FIG. 6B was implemented. The experiment was started with the phone typing and sending the first message. After which, a memory dump was performed immediately. The first message was then typed and sent by the PC. A memory dump was also performed immediately after the message was received. Therefore, the memory dump interval was the same as the typing time for a message, which was 37 seconds. A total of 30 messages were typed and sent (i.e. 15 in each direction).

Figure 7A:
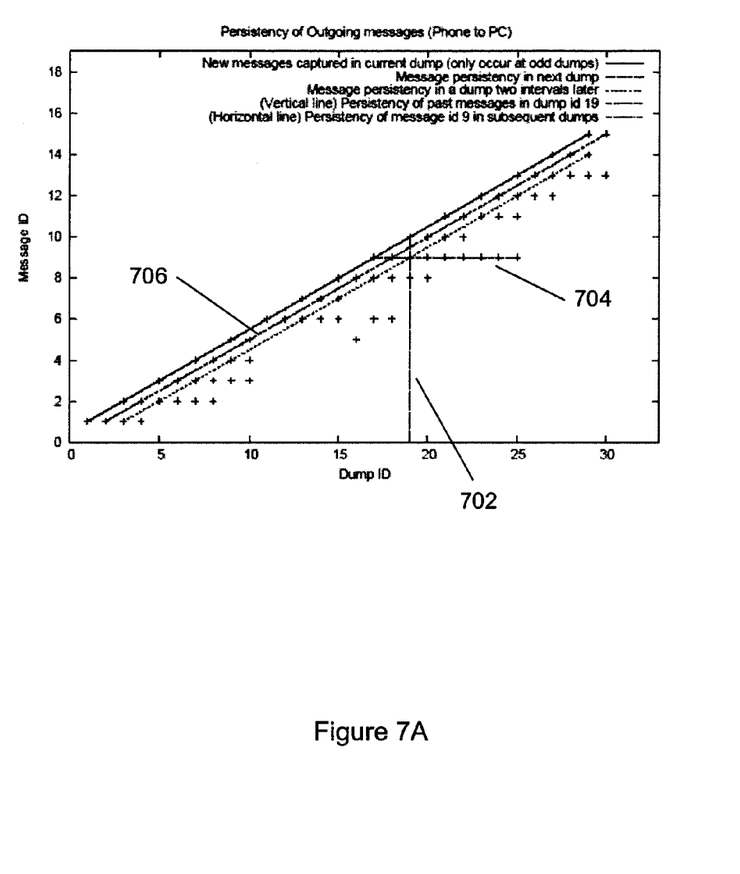
FIGS. 7A and 7B respectively show the persistency of outgoing messages (from a mobile device according to various embodiments) and incoming messages (to a mobile device according to various embodiments).
Figure 7B:
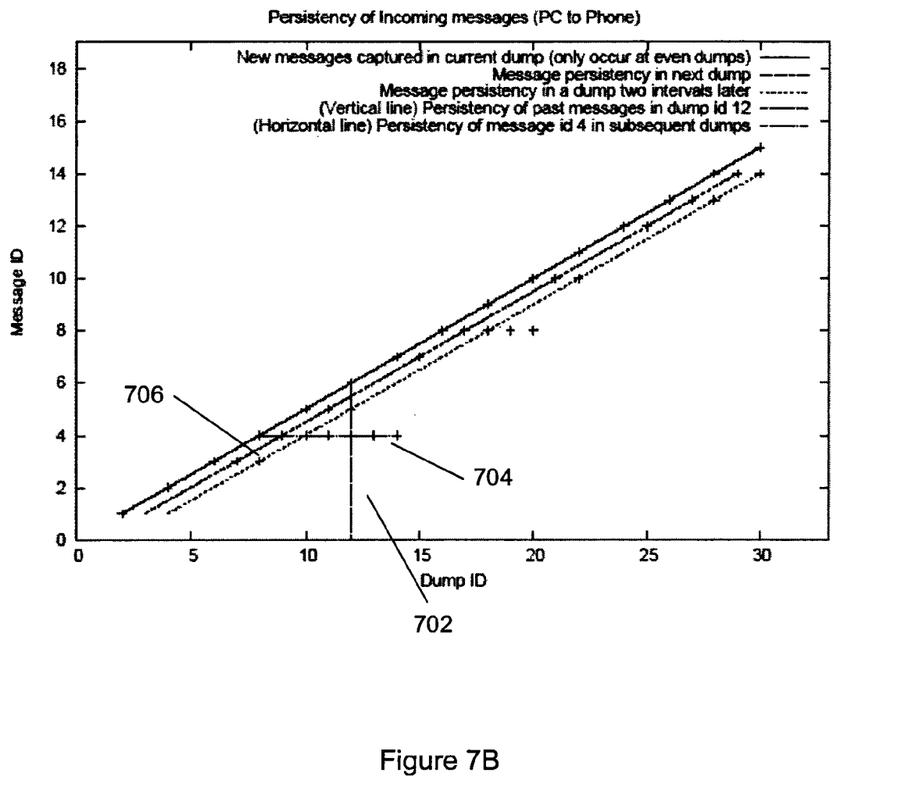

FIGS. 7A and 7B respectively show the persistency of the outgoing messages (from the phone) and incoming messages (to the phone). Each of the FIGS. 7A and 7B are a plot of message ID against dump ID. The dumps with the odd IDs were performed after each outgoing message was sent, while the dumps with even IDs were performed after each incoming message was received.

A vertically plotted line 702 at a dump ID gives an idea of the persistency of past messages in a particular dump, while a horizontally plotted line 704 at a message ID gives an idea of the persistency of the message in subsequent dumps. The plotted parallel diagonal lines 706 show the persistency of each message in the subsequent dumps.

For the outgoing messages shown in FIG. 7A, the message with ID 9 had the highest persistency which lasted for 8 intervals (i.e. 4.9 mins). 100% and 92.86% of the outgoing messages persisted for an interval (i.e. 37 seconds) and two intervals, respectively. The persistency of each message diminished gradually in the subsequent dumps.

For the incoming messages shown in FIG. 7B, the message with ID 4 had the highest persistency, lasting for 6 intervals (i.e. 3.7 mins). For the incoming messages, 64.29% and 50% persisted for an interval and two intervals, respectively. The persistency of the messages diminished quickly after that. From the results, outgoing messages had a higher persistency than the incoming messages.

In a second experiment, the effect of different memory dump intervals in different chat scenarios was investigated using the parameters (i.e. keypress interval, character set, message lengths and message sending interval) defined above. A total of 30 messages were typed and sent, with 15 in each direction. The memory dumping on the mobile phone was not performed immediately after each message was sent or received. Instead, a finite dump interval for each experiment was defined. A larger dump interval is desirable since fewer dumps consume lesser of the phone's valuable and limited resources (e.g. processing power, battery).

For the "waiting" scenario of FIG. 6B, 2 sets of experiments with dump intervals of 40 and 60 seconds were conducted. The results are presented in Table 1 below.

TABLE 1

Captured (whole) messages in waiting scenario with dump intervals of 40 and 60 seconds

| Message Length (Chars) | Dump Interval | | | |
|---|---|---|---|---|
| | 40 seconds | | 60 seconds | |
| | Outgoing Msgs | Incoming Msgs | Outgoing Msgs | Incoming Msgs |
| 75 | 15/15 | 15/15 | 15/15 | 13/15 |
| 150 | 15/15 | 15/15 | 15/15 | 15/15 |
| 225 | 15/15 | 14/15 | 15/15 | 15/15 |

It was observed that 100% of the evidence can be acquired successfully in the case of the outgoing messages with long dump intervals. For incoming messages, the average evidence acquisition rate was 97.8% with a dump interval of 40 seconds and 95.6% with a dump interval of 60 seconds.

For the "no-wait" scenario of FIG. 6A, as the outgoing and incoming messages were being sent and received continuously, the dump interval was reduced to enable a more reliable evidence capturing. Four sets of experiments were conducted, with each having a memory dump interval of 5, 10, 20 and 30 seconds. The results are presented in Tables 2 and 3 below.

TABLE 2

Captured (whole) messages in no-wait scenario with dump intervals of 5 and 10 seconds

| Message Length (Chars) | Dump Interval | | | |
|---|---|---|---|---|
| | 5 seconds | | 10 seconds | |
| | Outgoing Msgs | Incoming Msgs | Outgoing Msgs | Incoming Msgs |
| 75 | 15/15 | 15/15 | 15/15 | 13/15 |
| 150 | 15/15 | 15/15 | 15/15 | 13/15 |
| 225 | 15/15 | 15/15 | 15/15 | 13/15 |

TABLE 3

Captured (whole) messages in no-wait scenario with dump intervals of 20 and 30 seconds

| Message Length (Chars) | Dump Interval | | | |
|---|---|---|---|---|
| | 20 seconds | | 30 seconds | |
| | Outgoing Msgs | Incoming Msgs | Outgoing Msgs | Incoming Msgs |
| 75 | 15/15 | 11/15 | 15/15 | 12/15 |
| 150 | 15/15 | 13/15 | 15/15 | 13/15 |
| 225 | 15/15 | 10/15 | 15/15 | 13/15 |

It was observed that 100% of the evidence can be acquired successfully in the case of the outgoing messages for all the dump intervals. When the dump interval was 5 seconds, all the incoming messages were successfully captured as well. However, as the interval increased, the rate of successful acquisition dropped for the incoming messages (e.g. 86.7%, 75.6% and 84.4% for dump intervals of 10, 20 and 30 seconds, respectively).

Based on the experiments, it can be concluded that the outgoing messages had a higher persistency than the incoming ones. It was noticed during the experiments that due to the need for internal processing of the outgoing messages to be sent out through a network, multiple copies in different formats can exist in the mobile phone memory. In contrast, the incoming messages only existed in at most two copies in the memory. Therefore, the persistency for the incoming messages was lower and the successful acquisition rate was also lower than that for the outgoing messages.

While embodiments of the invention will be shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A method of acquiring information from volatile memory of a mobile device, the method comprising:
    accessing the volatile memory of the mobile device used by an application operating on the mobile device to store communicated information with a communication device;
    acquiring a copy of data present in the volatile memory;
    performing a process tracing or debugging system call attached to a process to suspend the operation of the application to acquire the copy of data present in the volatile memory and to resume the operation of the application thereafter; and
    analysing the copy of data to extract the communicated information.

2. The method of claim 1, wherein the process tracing or debugging system call comprises a Process Trace (ptrace) system call.

3. The method of claim 1, further comprising detecting an initiation of the application operating on the mobile device.

4. The method of claim 1, wherein the application uses a text message exchange service hosted on the communication device, so that the communicated information comprises a text message.

5. The method of claim 1, wherein the communication device is a server.

6. The method of claim 3, wherein the copy of data is acquired at a specified time interval from the initiation of the application.

7. The method of claim 6, wherein the specified time interval is determined by the frequency the application operating on the mobile device is communicating information with the communication device.

8. The method of claim 1, wherein analysing the copy of data to extract the communicated information comprises locating an identifier and extracting the content associated with the identifier so as to obtain the communicated information.

9. The method of claim 1, wherein the mobile device is a mobile phone.

10. A mobile device comprising:
    volatile memory configured to be used by an application operating on the mobile device to store communicated information with a communication device;
    an acquirer configured to acquire a copy of data present in the volatile memory;
    a processor configured to perform a process tracing or debugging system call attached to a process to suspend the operation of the application to acquire the copy of data present in the volatile memory and to resume the operation of the application thereafter; and
    an analyser configured to analyse the copy of data to extract the communicated information.

11. The mobile device of claim 10, wherein the process tracing or debugging system call comprises a Process Trace (ptrace) system call.

12. The mobile device of claim 10, further comprising a detector configured to detect an initiation of the application operating on the mobile device.

13. The mobile device of claim 10, wherein the application uses a text message exchange service hosted on the communication device, so that the communicated information comprises a text message.

14. The mobile device of claim 10, wherein the communication device is a server.

15. The mobile device of claim 12, wherein the acquirer is configured to acquire the copy of data at a specified time interval from the initiation of the application.

16. The mobile device of claim 15, wherein the specified time interval is determined by the frequency the application communicates information with the communication device.

17. The mobile device of claim 10, wherein the analyser is configured to locate data with an identifier and configured to extract the content associated with the identifier so as to obtain the communicated information.

18. The mobile device of claim 10, wherein the analyser is configured to execute a script to analyse the copy of data to extract the communicated information.

19. The mobile device of claim 10, wherein the mobile device is a mobile phone.

\* \* \* \* \*